United States Patent [19]
von Pragenau et al.

[11] B 3,984,072
[45] Oct. 5, 1976

[54] ATTITUDE CONTROL SYSTEM

[75] Inventors: George L. von Pragenau; Charles C. Rupp, both of Huntsville, Ala.

[73] Assignee: The United States of America as represented by the Administrator of the National Aeronautics and Space Administration, Washington, D.C.

[22] Filed: Oct. 2, 1974

[21] Appl. No.: 511,346

[44] Published under the second Trial Voluntary Protest Program on January 27, 1976 as document No. B 511,346.

[52] U.S. Cl. .............................. 244/169; 244/3.21; 244/171
[51] Int. Cl.² ........................................ B64G 1/20
[58] Field of Search ........... 244/164, 165, 171, 776, 244/55, 169, 3.2, 3.21; 235/150.2, 150.25

[56] References Cited
UNITED STATES PATENTS

| | | | |
|---|---|---|---|
| 3,132,828 | 5/1964 | Edinger et al. | 244/3.2 X |
| 3,301,508 | 1/1967 | Yamron | 244/3.2 X |
| 3,395,874 | 8/1968 | Bartoli et al. | 244/32 |

FOREIGN PATENTS OR APPLICATIONS
952,267  3/1964  United Kingdom .................. 244/3.2

*Primary Examiner*—Trygve M. Blix
*Assistant Examiner*—Barry L. Kelmachter
*Attorney, Agent, or Firm*—L. D. Wofford, Jr.; G. J. Porter; John R. Manning

[57] ABSTRACT

An attitude control system for a space vehicle in which angular rate signals are generated by rate gyros mounted closely adjacent to gimbaled engines at the rear of a vehicle, and wherein error signals representative of a commanded change in vehicle angle or attitude are obtained from a precision inertial platform located in the nose region of the vehicle. The rate gyro derived signals dominate at high frequencies where dynamic effects become significant, and platform signals dominate at low frequencies where precision signals are required for a steady vehicle attitude. The blended signals are applied in a conventional manner to control the gimbaling of vehicle engines about control axes.

1 Claim, 2 Drawing Figures

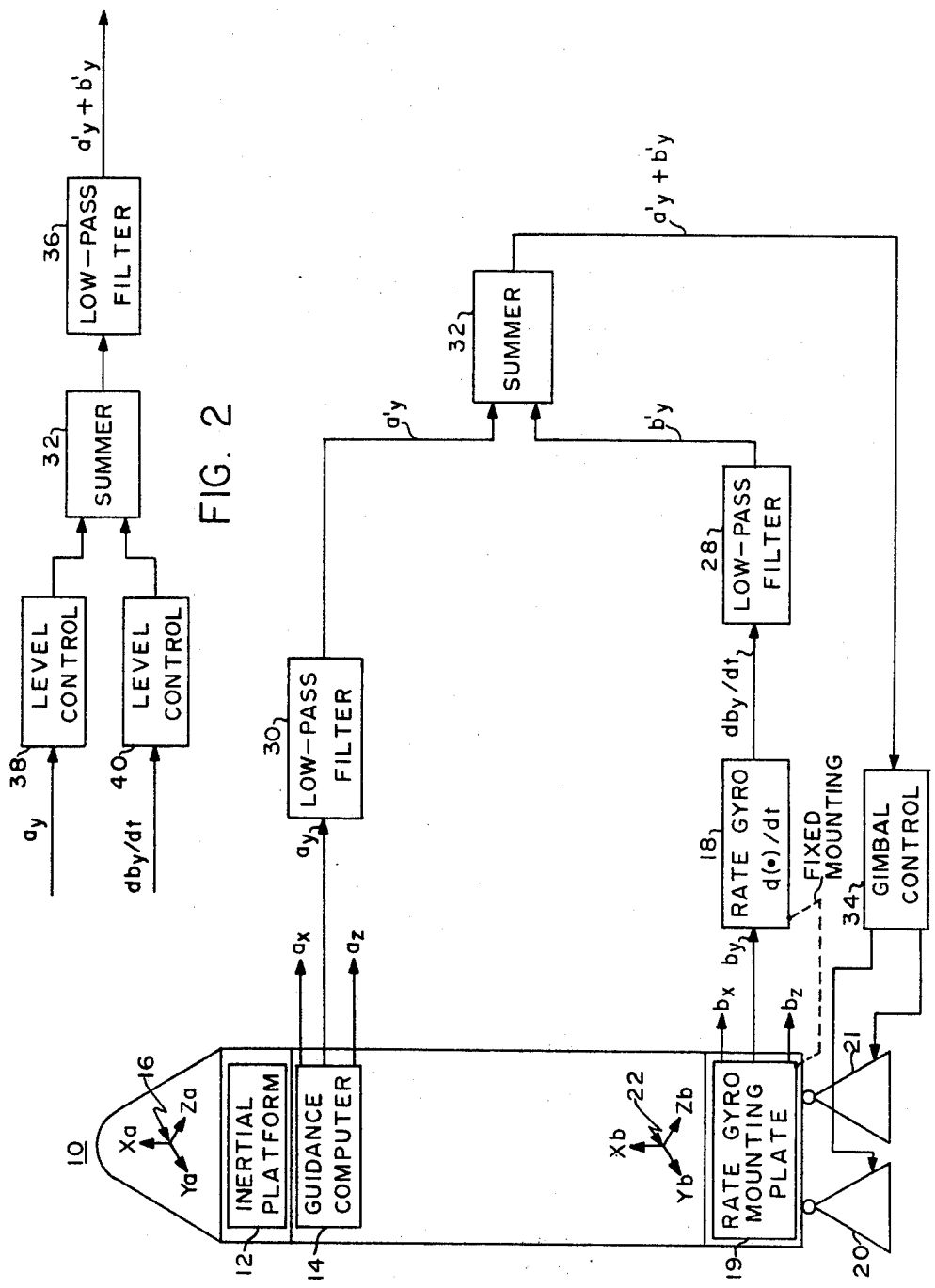

ATTITUDE CONTROL SYSTEM

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to directional control systems, and particularly to an attitude control system for a space vehicle.

2. General Description of the Prior Art

As space vehicles have been made larger, the problems associated with controlling their flight characteristics have vastly increased. In order to provide the needed sophistication in control systems, delicate and bulky apparatuses are required, and this often necessitates locating the control sensors spaced substantially from the engines, typically locating the control sensors in the nose region of the vehicle. Since a space vehicle is not a rigid object, vibrations and resonances develop, wherein movement of one portion of the vehicle is typically not in phase with movement of another portion of the vehicle. As a result, the attitude of the vehicle at one location is often not the same as the attitude elsewhere on the vehicle. The magnitude of this difference becomes particularly large when the attitude of the vehicle at the nose of the vehicle is instantaneously compared with the attitude of the vehicle at the tail of the vehicle. The difference reflects bending moments which exist along the length of the vehicle and complex compensations must typically be applied to control signals derived from attitude measurements in the nose of the vehicle to produce optimum commands to gimbaled engines located at the tail of the vehicle. The compensations are determined from extensive ground vibration tests of the vehicle and from elaborate computations which take into account propellant depletions and payloads for a particular flight. Not infrequently, however, after initial tests and computations are made, new flight plans are developed, necessitating new tests and computations. The result is a tremendously expensive effort in determining answers to stabilization questions.

OBJECT OF THE INVENTION

It is the object of the present invention to provide what might be termed a less critical attitude control system which will not be as sensitive to vehicle vibrations and resonances, enabling less compensation of attitude control systems for various vehicle configurations.

SUMMARY OF THE INVENTION

In accordance with the invention, strapped-down or fixed-mounted angular velocity sensors are positioned in the tail region of the vehicle near gimbaled engines and near where the vehicle is actually controlled. Typically, such devices would be rate gyros, and there would be one for the measurement of angular rate about each of the body coordinate axes of the vehicle, the roll, pitch, and yaw axes, A precision sensor such as a gyro stabilized platform would be conventionally positioned remote from vehicle engines, typically in the nose of the vehicle. Associated with it would be a guidance computer which would determine attitude commands for each of the three axes to cause the vehicle to assume commanded attitudes in order to perform selected maneuvers at particular times. Corresponding angular axis rate signals from rate gyros would be blended with each axis guidance signal as follows.

Each discrete axis command signal from the guidance computer would be filtered by a low-pass filter to block signals of a frequency higher than the lowest resonant frequency of the vehicle. Each rate gyro operates as a differentiator of the rotation angle of the rate gyro with respect to inertial space and provides a signal output having an amplitude characteristic which rises in amplitude with frequency and provides little output below the lowest vehicle resonance $f_0$. The resulting differentiation signal is passed through a low-pass filter, as in the case of the error signal and the inertial platform, and this filter produces an integrating effect on the frequencies passed, being, of course, a band of frequencies just above $f_0$. In this way, signals are derived from the rate gyro which are in an adjoining and thus complementary range of those just below $f_0$ from the inertial platform. And, significantly, the rate gyro derived signals are only present during relatively rapid vehicle movement.

The guidance computer signals and rate gyro derived signals are summed to provide a frequency dependent blend of the two signals. Alternately, guidance computer signals and rate gyro signals would be summed and then subjected to a low-pass filter. Thus, with either arrangement, when the space vehicle is relatively steady and signals are below the lowest vehicle resonance, the output of the guidance computer will dominate the control signal; and when the vehicle movement contains frequencies above the lowest vehicle resonant frequency, the angular error signals derived from the rate gyro will dominate. In such instance, the latter signal would be superimposed on a guidance computer derived signal to provide an instantaneously accurate and up-dated error control signal. derived from the rate gyro which are in an adjoining and thus accurate and up-dated attitude error control signal for the rate gyro location.

The thus obtained control signal is typically applied, or further compensated and then applied, to gimbal control devices which appropriately adjust the angular orientations of rocket engines to effect a desired stabilization or change of vehicle attitude.

BRIEF DESCRIPTION OF THE DRAWINGS

FIG. 1 is a schematic illustration of an embodiment of the invention.

FIG. 2 is a schematic illustration of a portion of an alternate embodiment of the invention.

DESCRIPTION OF THE PREFERRRED EMBODIMENT

Referring to the drawings, space vehcile 10 is generally depicted in simplified form. Stable or inertial platform 12 and guidance computer 14 would be conventionally interconnected and packaged together near the nose of the vehicle, as shown. The stable platform provides a fixed inertial reference and the guidance computer delivers and provides three outputs, each representative of one of the angles by which it is desired to rotate the vehicle to perform a desired maneuver at attitude correction. These are identified as $a_x$, $a_y$, and $a_z$ and related, respectively, to the roll, pitch, and yaw angles. They are computed in terms of vehicle orientation as seen at the nose of the vehicle with respect to axes 16 of stable platform 12.

Rate gyros 18 are each mounted on fixed mounting plate 19. Instead of being located in the same location with the inertial platform and guidance computer (as has been the case), mounting is in the tail section of the vehicle relatively near gimbaled engines 20 and 21. Three fixed-mounted or "strapped-down" rate gyros 18 are attached to mounting plate 19, and thus the rate gyros provide outputs representative of rate of angular movement of the vehicle about one of vehicle axes 22, as they appear at rear-mounted gyro mounting plate 19 with respect to inertial space. These outputs are identified as $db_x/dt$, $db_y/dt$, and $db_z/dt$ for the roll, pitch, and yaw axes, respectively.

Since vehicle processing is generally the same for each signal and control function, only one channel of control (the pitch axis channel) is illustrated in detail.

The angular pitch rotation $b_y$ of mounting plate 19 (with respect to inertial space) is applied to rate gyro 18, and the responsive electrical output of rate gyro 18 is passed through low-pass filter 28. The combined effects are to provide a band of position information signals above the lowest resonant frequency of vehicle 10, labeled output $b'_y$. This output represents an increment of attitude error that is a pitch angle signal which at any instance is equal to the increase or decrease in attitude error that has occurred.

The pitch command output $a_y$ from guidance computer 14 is applied to low-pass filter 30, which blocks frequencies higher than the lowest vehicle resonant frequency to provide a thus filtered output $a'_y$. The output $a'_y$ of filter 30 and the output $b'_y$ of low-pass filter 28 are applied to summer 32 where they are added. The resulting sum signal $a'_y + b'_y$ is a composite pitch angular error signal, and it is fed to pitch gimbal control 34, which in turn operates gimbaled motors 20 and 21 to effect attitude control of the vehicle in pitch. A like system is employed for control of the other axes of control of the vehicle.

The signal blending resulting from the processing of the signals as described above enables a control signal to be extremely accurately generated for both the stationary case of the vehicle where oscillatory frequencies $f$ are less than or equal to $f_0$, the frequency of the lowest vehicle resonant, and for the dynamic case where vehicle resonances $f$ are greater than $f_0$. Thus, the present invention enables dominance of a control system by the $a_y$ signal from guidance computer 14 when the frequency $f$ is less than or equal to $f_0$ and enables the system to be dominated by the signal derived from the rotation angle $b_y$ of the rate gyro mounting plate, typically for short periods, when the frequency $f$ is greater than $f_0$. For short periods, the mounting plate angle (with respect to inertial space) near engines 20 and 21 produces an extremely accurate control signal that can be applied to engines 20 and 21 for its control. Thus, at a time when oscillations are above the frequency $f_0$ and are particularly critical, they are rapidly taken into account. Usual computational delays inherent in obtaining signals from a typical guidance computer are avoided. Such a computer normally digitally calculates angular error signals in terms of an inertial or fixed coordinate system and then translates the signals to vehicle body coordinates before the signals can be used, and this takes a significant time. This is not true of rate gyros which are strapped to a vehicle and which provide an immediate output in terms of body coordinates.

An alternate arrangement of the invention is illustrated in FIG. 2 and in it the function of low-pass filters 28 and 30 are combined in a single filter 36, it being located after summer 32. In such case, there would be provided appropriate level controls 38 and 40, one for each channel preceding an input to summer 32.

If there is only one gimbaled engine, roll control may utilize reaction control jets in the vicinity of the location of a roll rate gyro. Pitch and yaw would still be controlled by gimbaling of the one engine.

It is to be noted that in order to alleviate the problem of signal delays encountered with precision guidance computers, auxiliary means have been employed to provide approximate command control signals in the interim between normal outputs. By use of the present invention, supplemental signals need not be generated.

It is acknowledged that in the past some effort has been made to derive attitude signal information from rate gyros by integration. This, however, has lead to inaccuracies due to biasing and other cumulative gyro errors. In the present case, these errors are avoided since gyro signal use is limited to short periods of time when critically needed.

It is to be further appreciated that in certain dynamic situations several strapped-down sensors may be used, particularly to provide outputs at particular frequencies of vibration and at particular places on the vehicle. Such applications are quite feasible because of the low cost of strapped-down sensors. The blending technique described would then be applied for at least one strapped-down sensor, and only one precision sensor would be required to update one or several strapped-down sensors. It is also feasible to arrange an updating chain where a first strapped-down sensor would be updated by a precision sensor, and the combined signals from a first blender would be used to update a second strapped-down sensor, and so forth. In such case, successive filters would be employed wherein the time constant of each would be progressively lower.

In summary, the present invention permits a free choice of precision sensor location independent of vehicle dynamics. The blending technique updates strapped-down rate sensor signals and reduces the computational effort because the signals from the strapped-down device are given in the required body fixed coordinates, and the updating by the precision signal can be performed at a slower rate. Vehicle control is corrected by low cost strapped-down sensors, sensing vehicle attitude information at essentially the point where control forces are applied. This enables a signal accuracy over a wide range of vehicle vibrations which approaches the obtainable from a precision inertial system operating in a more limited range. Bias and other errors common to strapped-down sensors are not integrated on a long-term basis, and thus accuracy does not deteriorate with time.

What is claimed is:

1. In an attitude control system for a space vehicle including at least one aft mounted and gimbaled motor, a motor gimbal control, the guidance means positioned in the forward region of said vehicle having an inertial reference platform and computing means for computing and providing attitude error signals in terms of a fixed inertial set of axes, the improvement comprising:
   angular rate sensing means comprising at least one rate gyro fixedly mounted on said vehicle in the aft end region of said vehicle for providing at least one set of rate signals representative of the rate of rotation of said vehicle about at least one axis, said rate signals increasing in amplitude with increasing frequency and having a relatively low output at frequencies below the lowest resonance of said vehicle;

summing means responsive to attitude error signals from said guidance means and rate signals from said angular rate sensing means for summing said rate signals and said error signals;

low-pass filter means responsive to summed signals from said summing means for applying an integrating and attenuating effect to said summed signals above the lowest resonant frequency of said vehicle and providing control signals to said motor gimbal control; and whereby for conditions of absence of vibrational frequencies higher than said lowest vehicle resonance, said control signals are dominated by attitude error filtered signals from said guidance means, and during the occurrence of vibrational frequencies of a freqency higher than said lowest vehicle resonant frequency, said control signals are dominated by filtered signals derived from said rate sensing means.

* * * * *